United States Patent
Inohiza

(10) Patent No.: US 12,317,299 B2
(45) Date of Patent: May 27, 2025

(54) COMMUNICATION APPARATUS, CONTROL METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 17/735,468

(22) Filed: May 3, 2022

(65) Prior Publication Data
US 2022/0264579 A1    Aug. 18, 2022

Related U.S. Application Data

(63) Continuation of application No. PCT/JP2020/040257, filed on Oct. 27, 2020.

(30) Foreign Application Priority Data

Nov. 7, 2019 (JP) .................................. 2019-202783

(51) Int. Cl.
| | |
|---|---|
| *H04W 72/53* | (2023.01) |
| *H04L 27/26* | (2006.01) |
| *H04W 72/52* | (2023.01) |
| *H04W 72/542* | (2023.01) |
| *H04W 84/12* | (2009.01) |

(52) U.S. Cl.
CPC ......... *H04W 72/53* (2023.01); *H04L 27/2602* (2013.01); *H04W 72/52* (2023.01); *H04W 72/542* (2023.01); *H04W 84/12* (2013.01)

(58) Field of Classification Search
CPC .. H04L 27/2602; H04W 84/12; H04W 72/53; H04W 72/542; H04W 72/52
See application file for complete search history.

(56) References Cited

U.S. PATENT DOCUMENTS

| | | | |
|---|---|---|---|
| 11,083,045 B2 * | 8/2021 | Takada | .................. H04W 84/02 |
| 11,706,058 B2 * | 7/2023 | Yoshikawa | ........... H04L 69/322 |
| | | | 375/262 |
| 11,843,973 B2 * | 12/2023 | Tsujimaru | ........... H04L 27/2602 |

(Continued)

FOREIGN PATENT DOCUMENTS

| | | | | |
|---|---|---|---|---|
| JP | 2018-526840 A | 9/2018 | | |
| KR | 20190117479 A | 10/2019 | | |
| WO | WO-2019203626 A1 * | 10/2019 | .......... | H04W 52/365 |

OTHER PUBLICATIONS

Rui Cao, et al., EHT Preamble Design, IEEE 802.11-19/1540r0, Sep. 2019.

(Continued)

*Primary Examiner* — Christopher B Robinson
*Assistant Examiner* — Angela Widhalm De Rodriguez
(74) *Attorney, Agent, or Firm* — Canon U.S.A., Inc., Division

(57) ABSTRACT

A communication apparatus 102 generates and transmits an Extremely High Throughput (EHT) Multi User (MU) Physical Layer Protocol Data Unit (PPDU) including an Extremely High Throughput-Signal-B (EHT-SIG-B) including information indicating that a plurality of Resource Units (RUs) is allocated to a communication apparatus 103, or a Trigger Frame including User Info including information indicating that a plurality of RUs is allocated to the communication apparatus 103.

25 Claims, 9 Drawing Sheets

(56) References Cited

U.S. PATENT DOCUMENTS

| | | | |
|---|---|---|---|
| 2017/0086212 A1 | 3/2017 | Kim et al. | |
| 2018/0254871 A1* | 9/2018 | Choi | H04W 72/0453 |
| 2018/0359761 A1 | 12/2018 | Chun | |
| 2019/0238288 A1 | 8/2019 | Liu | |
| 2019/0327019 A1 | 10/2019 | Hu et al. | |
| 2020/0382998 A1* | 12/2020 | Cao | H04L 1/0041 |
| 2021/0127291 A1* | 4/2021 | Chen | H04L 27/2603 |
| 2022/0345275 A1* | 10/2022 | Hu | H04L 5/0053 |

OTHER PUBLICATIONS

Roya Doostnejad, et al., Implicit Channel Sounding in IEEE 802.11, IEEE 802.11-19/0768r1, May 2019.

Sameer Vermani, et al., Further Ideas on EHT Preamble Design, IEEE 802.11-19/1870r4, Nov. 2019.

Rui Cao (Marvell) et al., "EHT Preamble Design", IEEE802.11-19/1540r0, [online], Sep. 15, 2019, slides 1-14.

Xiaogang Chen et Al., 11be Preamble Structure, IEEE 802.11-19/1516r0, Sep. 15, 2019.

\* cited by examiner

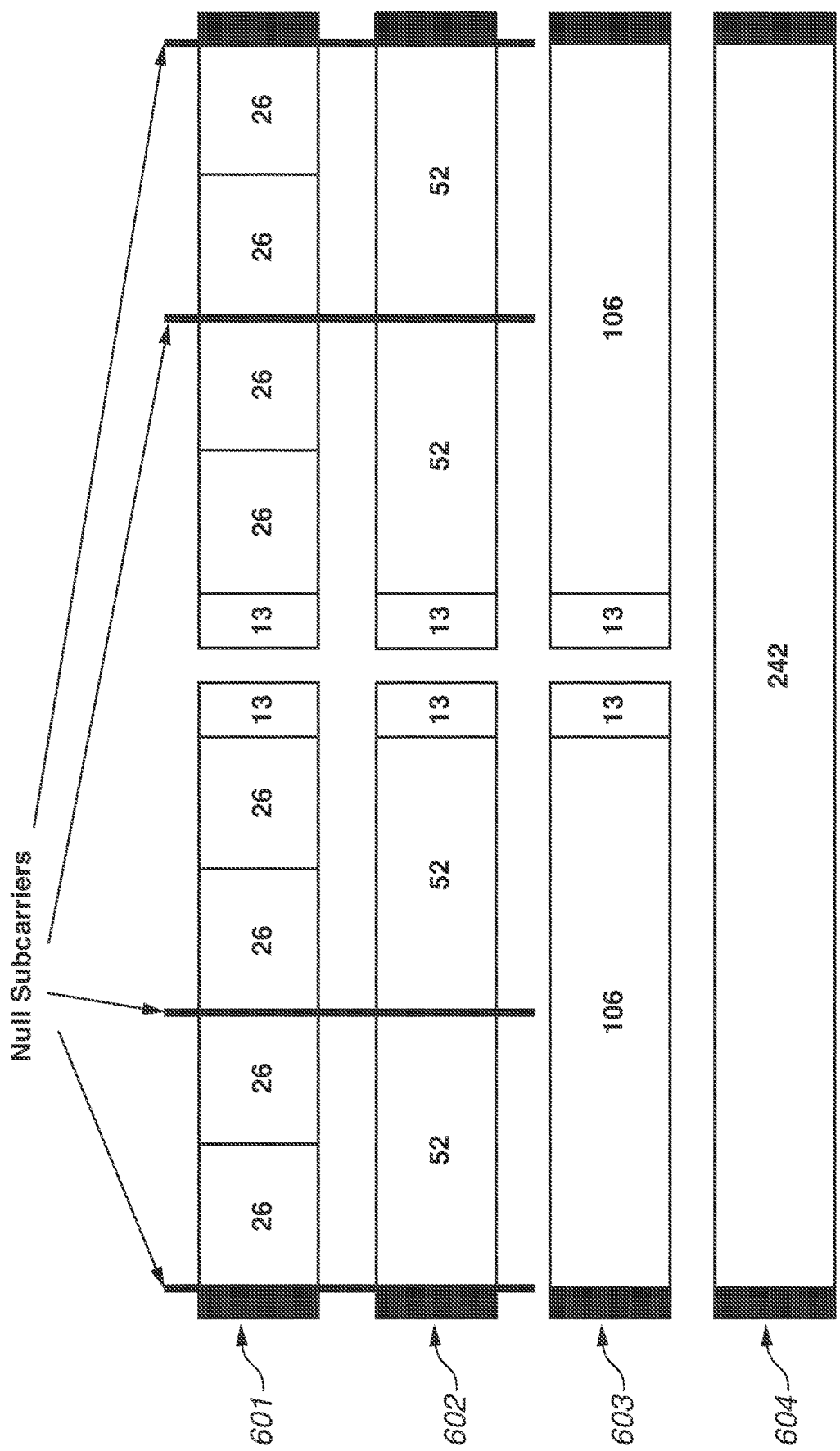

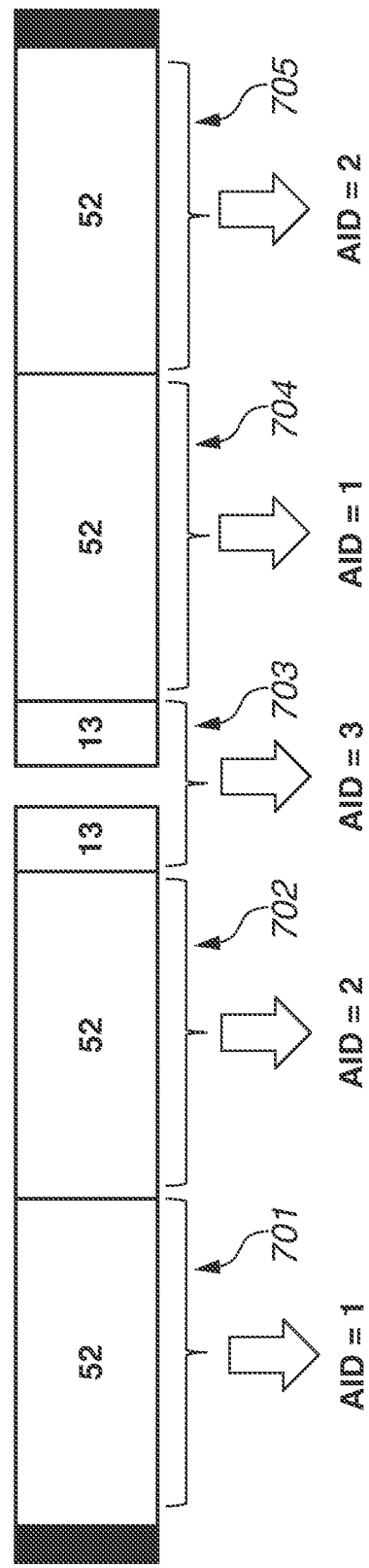

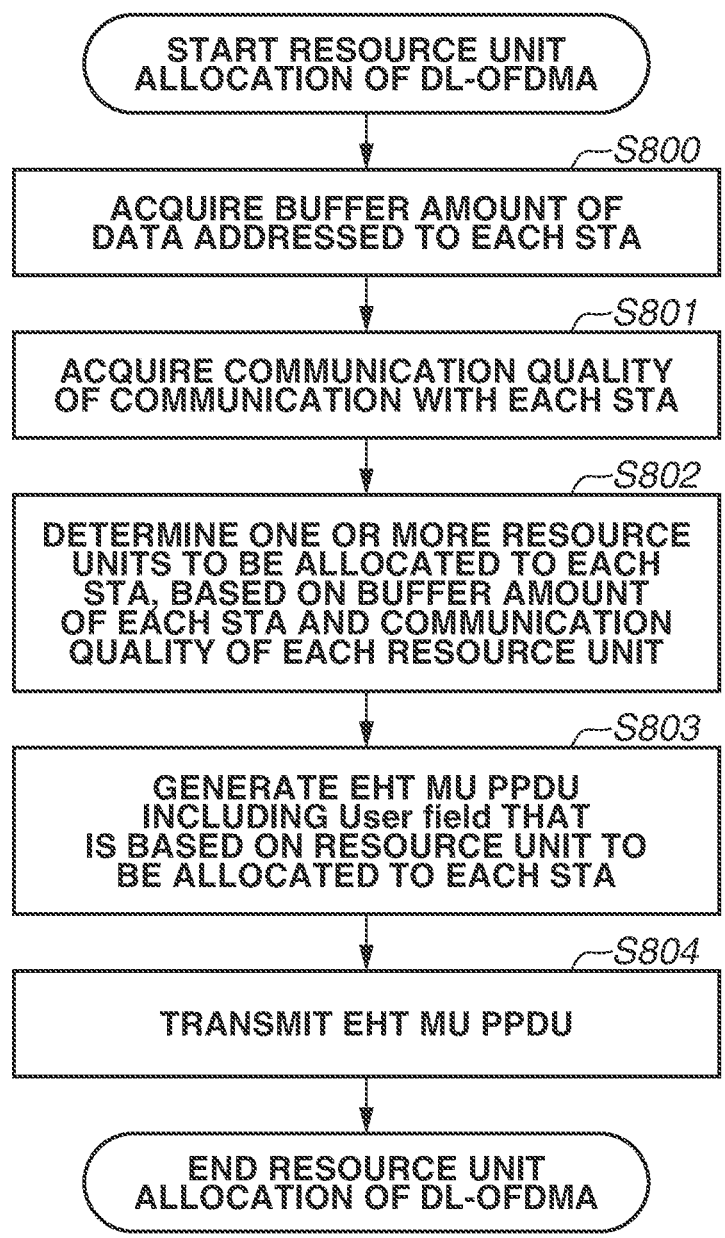

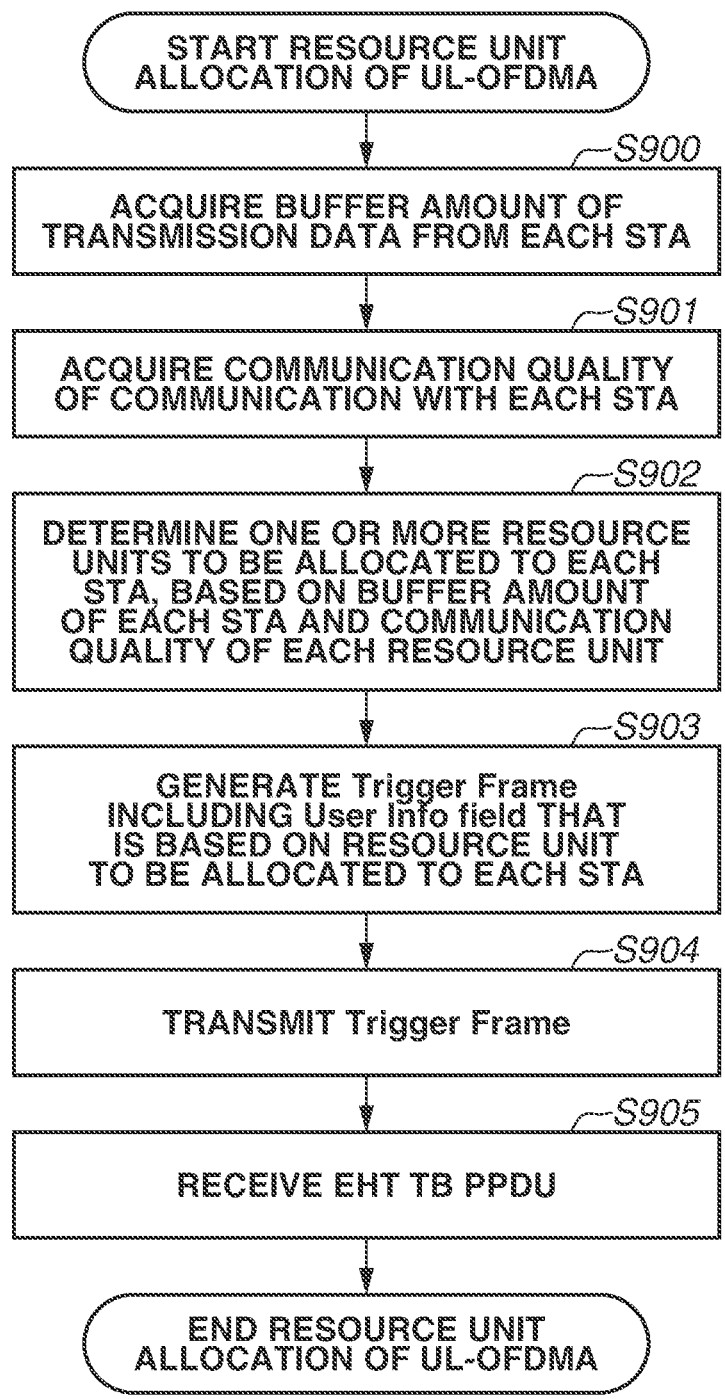

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2020/040257, filed Oct. 27, 2020, which claims the benefit of Japanese Patent Application No. 2019-202783, filed Nov. 7, 2019, both of which are hereby incorporated by reference herein in their entirety.

BACKGROUND OF THE INVENTION

Field of the Invention

The present invention relates to allocation of a band in wireless communication.

Background Art

As wireless local area network (WLAN) communication standards formulated by the Institute of Electrical and Electronics Engineers (IEEE), IEEE802.11 series standards have been known. The WLAN stands for a wireless local area network. The IEEE802.11 series standards include standards such as IEEE802.11a/b/g/n/ac/ax standards. The IEEE considers to formulate an IEEE802.11be standard as a new standard of IEEE802.11 series standards.

Patent Literature 1 discusses executing wireless communication using orthogonal frequency division multiple access (OFDMA) in the IEEE802.11ax standard. In the IEEE802.11ax standard, by executing wireless communication using the OFDMA, high peak throughput is realized. In addition, in the IEEE802.11ax standard, by executing wireless communication using the OFDMA, multi-user (MU) communication is realized. In the MU communication, one access point (AP) concurrently communicates with a plurality of stations (STAs). The AP is an apparatus having a role of constructing a network, and the STAs are apparatuses having a role of participating in the network constructed by the AP. In the MU communication performed using the OFDMA, by the AP allocating a partial band (resource unit (RU)) of a frequency bandwidth used for the MU communication, to each STA, concurrent communication with a plurality of STAs is implemented.

In the MU communication discussed in Patent Literature 1, one RU is allocated to one STA. Nevertheless, depending on the number of STAs and a division method of a frequency band, for example, an RU allocated to none of STAs has appeared, and it has been unable to efficiently use the frequency band. Alternatively, for example, in a case where the communication quality of a partial frequency component included in an RU allocated to a STA worsens, it has been unable to further allocate an RU with good communication quality to the STA, and it has been unable to efficiently use the frequency band.

CITATION LIST

Patent Literature

PTL 1: Japanese Patent Application Publication No. 2017-0086212

SUMMARY OF THE INVENTION

The present invention is directed to enhancing usage efficiency of a frequency band by enabling a communication apparatus to allocate a plurality of RUs to a different communication apparatus.

In view of the above, a communication apparatus according to an aspect of the present invention includes a generation unit configured to generate an Extremely High Throughput (EHT) Multi User (MU) Physical Layer Protocol Data Unit (PPDU) including a Legacy-Short Training Field (L-STF), a Legacy-Long Training Field (L-LTF) following the L-STF, a Legacy-Signal (L-SIG) following the L-LTF, an Extremely High Throughput-Signal-A (EHT-SIG-A) following the L-SIG, an EHT-SIG-B being a field following the EHT-SIG-A, and including information indicating that a plurality of Resource Units (RUs) is allocated to one different communication apparatus, an Extremely High Throughput-Short Training Field (EHT-STF) following the EHT-SIG-B, and an Extremely High Throughput-Long Training Field (EHT-LTF) following the EHT-STF, and a transmission unit configured to transmit the EHT MU PPDU generated by the generation unit.

In addition, a communication apparatus according to another aspect of the present invention includes a generation unit configured to generate a Trigger Frame including a Frame control, a Duration following the Frame control, a receiver address (RA) following the Duration, a transmitter address (TA) following the RA, Common Info following the TA, and User Info following the Common Info, and including information indicating that a plurality of Resource Units (RUs) is allocated to one different communication apparatus, and a transmission unit configured to transmit the Trigger Frame generated by the generation unit.

Further features of the present invention will become apparent from the following description of exemplary embodiments with reference to the attached drawings.

BRIEF DESCRIPTION OF THE DRAWINGS

FIG. 6 is a diagram illustrating an example of an allocation method of a resource unit that is employed by the communication apparatus 102 in a case where a 20-megahertz (MHz) bandwidth is used as a frequency bandwidth.

FIG. 7 is a diagram illustrating an example of an allocation method of a plurality of resource units that is employed by the communication apparatus 102.

FIG. 8 is a flowchart illustrating processing to be executed by the communication apparatus 102 in a case where down link (DL)-orthogonal frequency division multiple access (OFDMA) communication is performed.

FIG. 9 is a flowchart illustrating processing to be executed by the communication apparatus 102 in a case where up link (UL)-OFDMA communication is performed.

DESCRIPTION OF THE EMBODIMENTS

Figure 1:
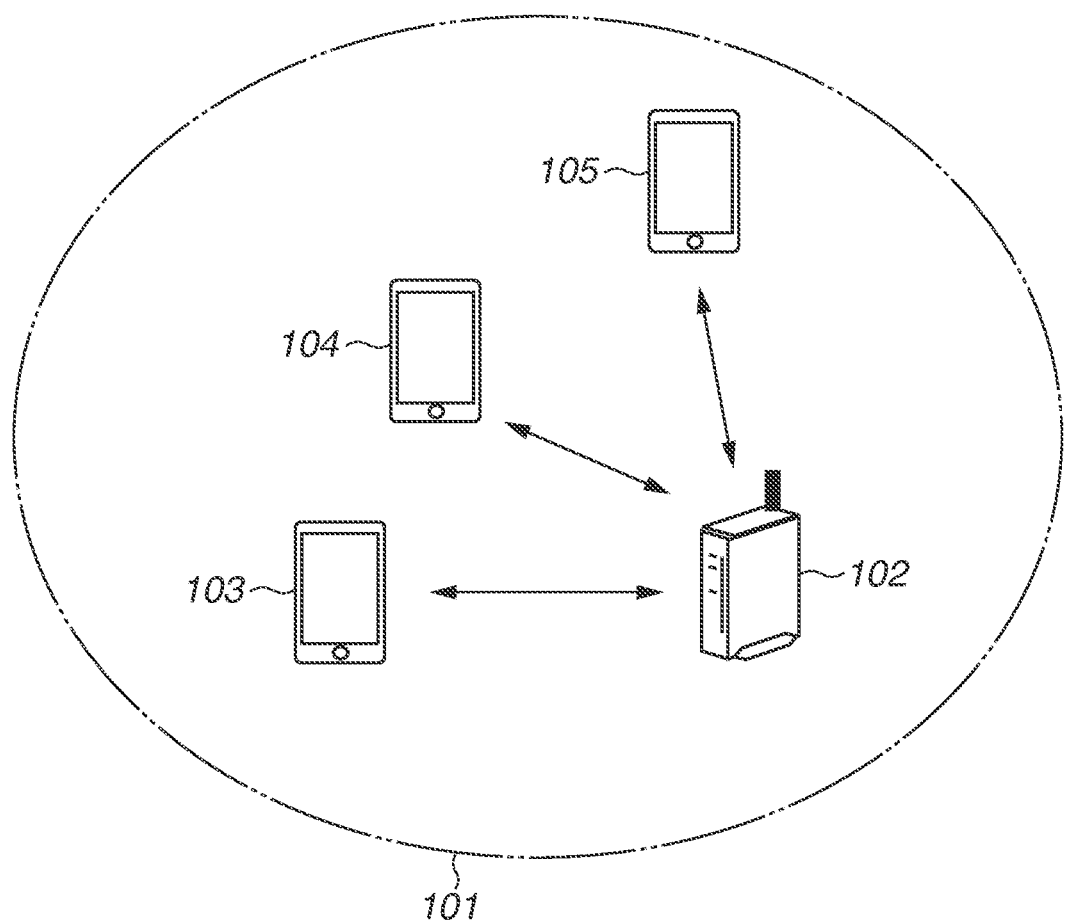
FIG. 1 is a diagram illustrating a configuration of a network in which a communication apparatus 102 participates.

Hereinafter, an exemplary embodiment of the present invention will be described in detail with reference to the attached drawings. The configurations described in the following exemplary embodiment are mere examples, and the present invention is not limited to the configurations illustrated in the drawings.

FIG. 1 illustrates a configuration of a network in which a communication apparatus 102 according to the present exemplary embodiment participates. The communication apparatus 102 is an access point (AP) having a role of constructing a network 101. The network 101 is a wireless network. In addition, communication apparatuses 103, 104, and 105 are stations (STAs) each having a role of participating in the network 101. Each of the communication apparatuses complies with the IEEE802.11be (extremely high throughput (EHT)) standard, and can execute wireless communication complying with the IEEE802.11be standard, via the network 101. The IEEE stands for the Institute of Electrical and Electronics Engineers. In addition, the EHT stands for extremely high throughput. In addition, the EHT may be interpreted as an abbreviation of extreme high throughput. Each of the communication apparatuses can execute communication in frequency bands including a 2.4-gigahertz (GHz) bandwidth, a 5-GHz bandwidth, and a 6-GHz bandwidth. In addition, each of the communication apparatuses can execute communication using bandwidths including a 20-megahertz (MHz) bandwidth, a 40-MHz bandwidth, a 80-MHz bandwidth, a 160-MHz bandwidth, and a 320-MHz bandwidth.

By executing orthogonal frequency division multiple access (OFDMA) communication complying with the IEEE802.11be standard, the communication apparatuses 102 to 105 can implement multi-user (MU) communication in which signals of a plurality of users are multiplexed. The OFDMA stands for orthogonal frequency division multiple access. In the OFDMA communication, a part (resource unit (RU)) of divided frequency bands is allocated to each STA while avoiding redundancy, and carriers allocated to the respective STAs are orthogonal to each other. The AP can therefore concurrently communicate with a plurality of STAs.

In addition, the communication apparatuses 102 to 105 can implement MU communication using multi user multiple-input and multiple-output (MU MIMO) communication. In this case, the communication apparatus 102 includes a plurality of antennas, and can implement concurrent communication with a plurality of STAs by using the plurality of antenna. By performing adjustment in such a manner that radio waves transmitted to the communication apparatuses 103 to 105 do not interfere with each other, the communication apparatus 102 can concurrently transmit radio waves to a plurality of STAs.

The communication apparatus 102 may implement MU communication by combining the OFDMA communication and the MU MIMO communication. More specifically, when executing MU communication with a plurality of STAs, the AP may execute MU MIMO communication in an RU with the number of subcarriers being equal to or larger than a certain threshold. For example, in a case where an RU is allocated to a plurality of STAs, the AP may communicate with one STA in an RU with the number of subcarriers being smaller than 106, and the AP may execute MU MIMO communication with a plurality of STAs in an RU with the number of subcarriers being equal to or larger than 106.

In this manner, in a case where MU communication is executed, the communication apparatuses 103 to 105 are required to acquire information regarding the allocation of an RU to each STA. Thus, the communication apparatus 102 notifies the communication apparatuses 103 to 105 of the allocation of an RU to be used in data communication, to each STA, using a physical layer (PHY) frame.

In addition, the communication apparatus 102 of the present exemplary embodiment can allocate two or more RUs to one STA. In this case, RUs to be allocate may be two or more RUs having continuous frequency components, or may be two or more RUs having discontinuous frequency components.

For example, in a case where the communication apparatus 102 communicates with the communication apparatuses 103 to 105, by allocating two or more RUs only to the communication apparatus 103, the communication apparatus 102 can execute data communication preferentially with the communication apparatus 103. In this manner, by allocating a plurality of RUs to one STA, the AP can ensure a wide frequency band for communication with the STA, and can preferentially communicate with the STA.

In addition, in a case where only one RU is allocated to one STA, depending on a division method of a frequency band, no STA is allocated to a part of RUs in some cases. For example, in a case where an AP communicates with three STAs, in a case where a frequency band is divided into four, no STA is allocated to one RU. Nevertheless, by allocating a plurality of RUs to one STA like the communication apparatus 102 of the present exemplary embodiment, an RU wasted in a case where only one RU is allocated to one STA can also be utilized.

In addition, for example, in a case where the communication quality of a partial frequency component included in an RU allocated to the communication apparatus 103 worsens due to the movement of at least either of the communication apparatuses 102 and 103 or the lapse of time, the communication apparatus 102 may allocate a plurality of discontinuous RUs with good communication quality. Specifically, in a case where the communication apparatus 102 allocates an RU with the number of subcarriers of 52 to the communication apparatus 103, two non-adjacent RUs with the number of subcarriers of 26 may be allocated. In this manner, by allocating two or more non-adjacent RUs to one STA, the AP can ensure a wide frequency band for communicating with the STA even in a case where the communication quality of adjacent RUs is not good.

The communication apparatus 102 to 105 comply with the IEEE802.11be standard, but the communication apparatus 102 to 105 may additionally comply with at least any one of legacy standards, which are standards formulated earlier than the IEEE802.11be standard. The legacy standards refer to the IEEE802.11a/b/g/n/ac/ax standards. In addition to the IEEE802.11 series standards, the communication apparatus 102 to 105 may comply with other communication standards such as Bluetooth (registered trademark), near field communication (NFC), an ultra wide band (UWB), ZigBee, and multi band OFDM alliance (MBOA). In addition, the UWB stands for an ultra wide band, and the MBOA stands for multi band OFDM alliance. In addition, the OFDM stands for orthogonal frequency division multiplexing. In addition, the NFC stands for near field communication. The UWB includes a wireless universal serial bus (USB), wireless 1394, Winners Information Network (WiNET), and the like.

In addition, the communication apparatus 102 to 105 may comply with a communication standard of wired communication of a wired local area network (LAN) or the like.

Specific examples of the communication apparatus 102 include a wireless LAN router, a personal computer (PC), and the like, but the communication apparatus 102 is not limited to these. The communication apparatus 102 may be any communication apparatus as long as the communication apparatus can execute MU communication with a different communication apparatus. In addition, the communication apparatus 102 may be an information processing apparatus such as a wireless chip that can execute wireless communication complying with the IEEE802.11be standard. In addition, specific examples of the communication apparatuses 103 to 105 include a camera, a tablet, a smartphone, a PC, a mobile phone, a video camera, and the like, but the communication apparatuses 103 to 105 are not limited to these. The communication apparatuses 103 to 105 are only required to be communication apparatuses that can execute MU communication with a different communication apparatus. In addition, the communication apparatuses 103 to 105 may be information processing apparatuses such as a wireless chip that can execute wireless communication complying with the IEEE802.11be standard. In addition, the network illustrated in FIG. 1 is a network including one AP and three STAs, but the number of APs and the number of STAs are not limited to these. In addition, an information processing apparatus such as a wireless chip includes an antenna for transmitting a generated signal.

Figure 2:
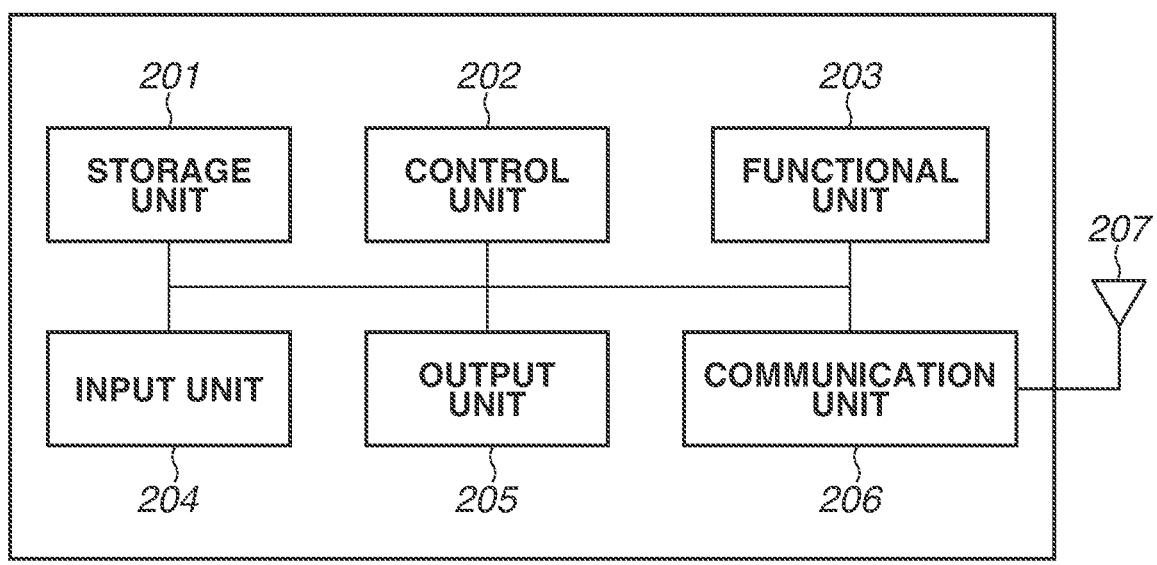
FIG. 2 is a diagram illustrating a hardware configuration of the communication apparatus 102.

FIG. 2 illustrates a hardware configuration of the communication apparatus 102 according to the present exemplary embodiment. The communication apparatus 102 includes a storage unit 201, a control unit 202, a functional unit 203, an input unit 204, an output unit 205, a communication unit 206, and an antenna 207.

The storage unit 201 includes one or more memories such as a read-only memory (ROM) and a random access memory (RAM), and stores computer programs for performing various operations to be described below, and various types of information such as communication parameters for wireless communication. The ROM stands for a read only memory and the RAM stands for a random access memory. Aside from memories such as a ROM and a RAM, a storage medium such as a flexible disk, a hard disk, an optical disk, a magneto-optical disk, a compact disk read only memory (CD-ROM), a CD recordable (CD-R), a magnetic tape, a nonvolatile memory card, or a digital versatile disk (DVD) may be used as the storage unit 201. In addition, the storage unit 201 may include a plurality of memories and the like.

The control unit 202 includes one or more processors such as a central processing unit (CPU) and a micro processing unit (MPU), for example. By executing computer programs stored in the storage unit 201, the control unit 202 controls the entire communication apparatus 102. In addition, the control unit 202 may control the entire communication apparatus 102 in cooperation with computer programs stored in the storage unit 201, and an operating system (OS). In addition, the control unit 202 generates data and signals to be transmitted in the communication with a different communication apparatus. The CPU stands for a central processing unit and the MPU stands a micro processing unit. In addition, the control unit 202 may include a plurality of processors such as multi-core processors, and control the entire communication apparatus 102 using the plurality of processors.

In addition, the control unit 202 executes predetermined processing such as wireless communication, image capturing, printing, or projection by controlling the functional unit 203. The functional unit 203 is hardware for the communication apparatus 102 executing predetermined processing.

The input unit 204 receives various operations from the user. The output unit 205 performs various outputs to the user via a monitor screen and a speaker. The output performed by the output unit 205 may be display on the monitor screen, a voice output by the speaker, vibration output, or the like. In addition, both the input unit 204 and the output unit 205 may be implemented by one module like a touch panel. In addition, the input unit 204 and the output unit 205 may be each formed integrally with the communication apparatus 102, or may be each formed separately from the communication apparatus 102.

The communication unit 206 controls wireless communication complying with the IEEE802.11be standard. In addition, the communication unit 206 may control wireless communication complying with a different IEEE802.11 series standard in addition to the IEEE802.11be standard, and may control wired communication of a wired LAN or the like. The communication unit 206 controls the antenna 207 and transmits and receives signals for wireless communication that have been generated by the control unit 202. In a case where the communication apparatus 102 complies with an NFC standard, a Bluetooth standard, and the like in addition to the IEEE802.11be standard, the communication unit 206 may control wireless communication complying with these communication standards. In addition, in a case where the communication apparatus 102 can execute wireless communication complying with a plurality of communication standards, the communication units 206 and the antennas 207 that correspond to the respective communication standards may be individually included. Via the communication unit 206, the communication apparatus 102 communicates data such as image data, document data, and video data to and from the communication apparatuses 103 to 105. In addition, the antenna 207 may be formed separately from the communication unit 206, or may be formed as one module together with the communication unit 206.

In addition, the communication apparatuses 103 to 105 each have a hardware configuration similar to the communication apparatus 102.

Figure 3:
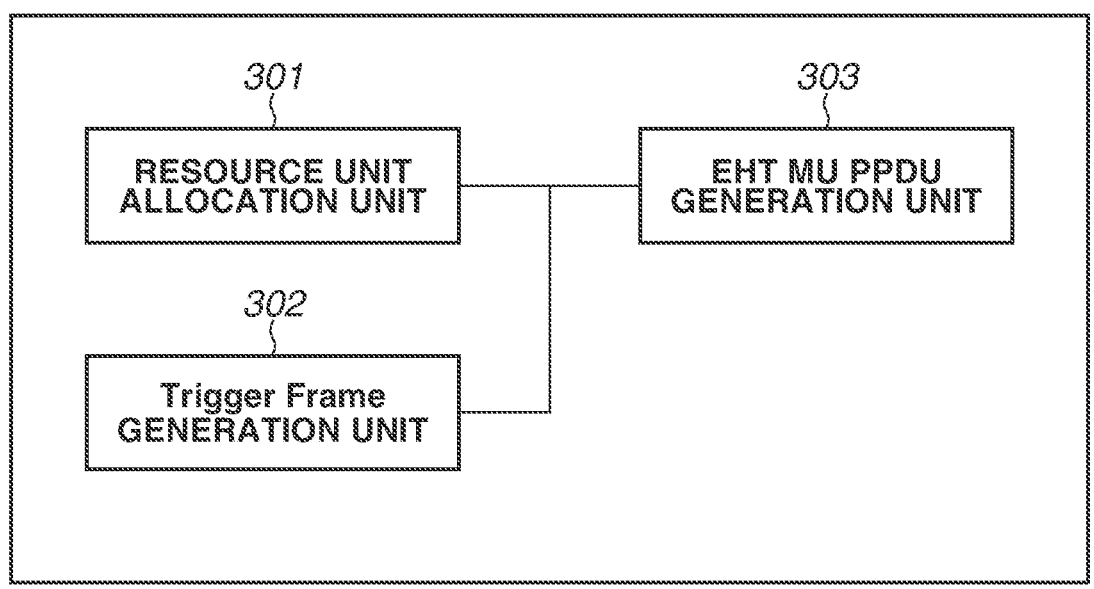
FIG. 3 is a diagram illustrating a functional block configuration of the communication apparatus 102.

FIG. 3 illustrates a functional block configuration of the communication apparatus 102 according to the present exemplary embodiment. The communication apparatus 102 includes a resource unit allocation unit 301, a Trigger Frame generation unit 302, and an EHT MU physical layer protocol data unit (PPDU) generation unit 303.

The resource unit allocation unit 301 is a block that allocates an RU to each STA in a case where the communication apparatus 102 performs OFDMA communication with a plurality of STAs. The resource unit allocation unit 301 determines an RU to be allocated to each STA, based on communication quality of each RU and a buffer amount of data communicated to and from each STA.

The Trigger Frame generation unit 302 is a block that generates a Trigger Frame to be transmitted by the communication apparatus 102 in a case where up link (UL) communication of transmitting data from a STA to an AP is performed. The Trigger Frame will be described below with reference to FIG. 5.

The EHT MU PPDU generation unit 303 is a block that generates an EHT MU PPDU to be transmitted by the communication apparatus 102 in a case where down link (DL) communication of transmitting data from an AP to a STA is performed. The PPDU stands for a physical layer (PHY) protocol data unit. The EHT MU PPDU will be described below with reference to FIG. 4.

Both of the Trigger Frame and the EHT MU PPDU are frames including information regarding the allocation of an RU to a STA with which MU communication is to be performed.

Figure 4:
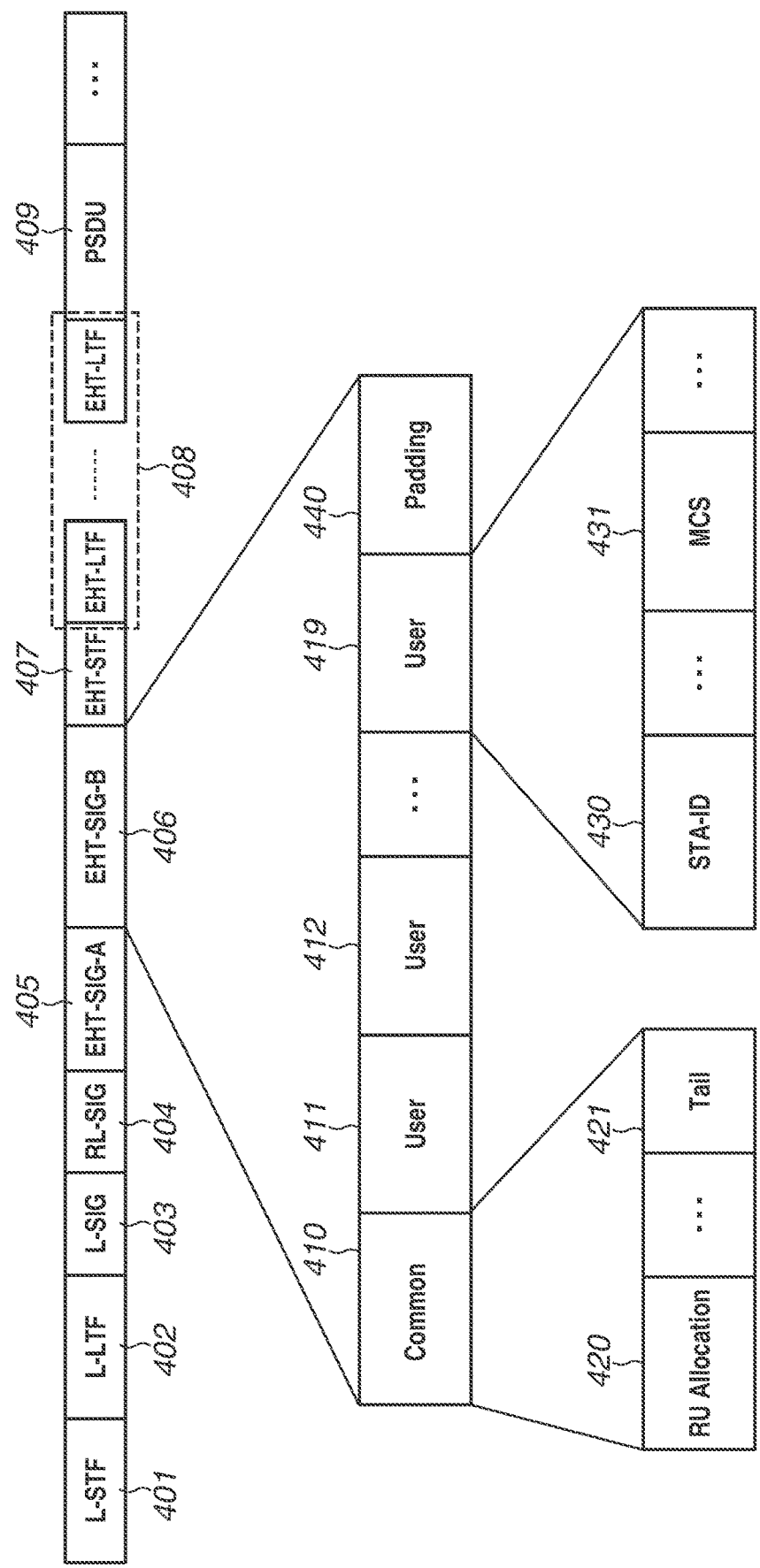
FIG. 4 is a diagram illustrating an example of a frame format of an extremely high throughput (EHT) multi-user (MU) physical layer protocol data unit (PPDU) to be transmitted by the communication apparatus 102.

FIG. 4 illustrates an example of a frame format of an EHT MU PPDU to be transmitted by the communication apparatus 102. The EHT MU PPDU has a frame format to be used when a communication apparatus complying with the IEEE802.11be standard executes DL MU communication. This frame includes, from a head portion, a Legacy-Short Training Field (L-STF) 401, a Legacy-Long Training Field (L-LTF) 402, a Legacy-Signal (L-SIG) 403, a Repeated Legacy Signal (RL-SIG) 404, an Extremely High Throughput-Signal-A (EHT-SIG-A) 405, an EHT-SIG-B 406, an Extremely High Throughput-Short Training Field (EHT-STF) 407, and an Extremely High Throughput-Long Training Field (EHT-LTF) 408. In addition, the EHT-LTF 408 is followed by a PHY service data unit (PSDU) 409. The PSDU 409 stores data addressed to each STA. In addition, the arrangement order of fields of the EHT MU PPDU is not limited to this. The STF stands for a Short Training Field, the LTF stands for a Long Training Field, and the SIG stands for a Signal. In addition, "L-" stands for a Legacy. For example, the L-STF stands for a Legacy Short Training Field. Similarly, "EHT-" stands for Extremely High Throughput. For example, the EHT-STF stands for an Extremely High Throughput Short Training Field. In addition, the RL-SIG stands for a Repeated Legacy Signal.

The L-STF 401, the L-LTF 402, and the L-SIG 403 are backward compatible with the IEEE802.11a/b/g/n/ac/ax standards, which are legacy standards formulated earlier than the IEEE802.11be standard. More specifically, the L-STF 401, the L-LTF 402, and the L-SIG 403 are legacy fields decodable by communication apparatuses complying with the IEEE802.11ax standard and IEEE802.11 series standards earlier than the IEEE802.11ax standard.

The L-STF 401 is used for the detection of wireless packet signals, automatic gain control (AGC), timing detection, and the like. The L-LTF 402 is used for high-precision frequency/time synchronization, channel state information (CSI) acquisition, and the like. The L-SIG 403 is used for transmitting control information including a communication rate and information regarding a length. In addition, the RL-SIG 404 may be omitted.

The EHT-SIG-A 405, the EHT-SIG-B 406, the EHT-STF 407, and the EHT-LTF 408 are EHT fields decodable by communication apparatuses complying with the IEEE802.11be standard.

The EHT-SIG-B 406 includes a common field 410, user fields 411 to 419, and a padding 440. In addition, the number of user fields included in the EHT-SIG-B 406 corresponds to the number of STAs to which the communication apparatus 102 allocates RUs. In addition, the padding 440 is a field for adjusting a size of an EHT-SIG-B, and may be omitted. In addition, the name of the Common field may be a Common info field. In addition, the name of the User field may be a User Info field.

The common field 410 includes information common to all STAs to which the communication apparatus 102 transmits an EHT MU PPDU. Table 1 lists subfields included in the common field 410.

TABLE 1

| Subfield | | Number of bits | Description |
|---|---|---|---|
| Common field | RU Allocation | N × 8 | Indicating RU allocation used in a data part of a frequency axis.<br>Case of N = 1: allocation of EHT MU PPDU of 20 MHz and 40 MHz<br>Case of N = 2: allocation of EHT MU PPDU of 80 MHz<br>Case of N = 4: allocation of EHT MU PPDU of 160 MHz or 80 + 80 MHz<br>Case of N = 8: allocation of EHT MU PPDU of 320 MHz or 160 + 160 MHz |
| | Center 26-tone RU | 1 | Used in a case where used bandwidth of EHT MU PPDU is 80 MHz or more.<br>Indicating whether to use the center 26-tone RU. |
| | CRC | 4 | CRC calculated value. |
| | Tail | 6 | Trailer bit. Set to 0. |

An RU Allocation subfield 420 is a field including N×eight bits, and is a field indicating information regarding RU allocation. Specifically, the RU Allocation subfield 420 stores information indicating the type of mapping performed in the PSDU 409. In the case of indicating RU allocation performed when a 20-MHz bandwidth is used as a bandwidth, the RU Allocation subfield includes eight bits (N=1), and indicates RU allocation in the 20-MHz bandwidth. In the present exemplary embodiment, because up to a 320-MHz bandwidth can be used as a bandwidth, the RU Allocation subfield indicates RU allocation performed when the maximum 320-MHz bandwidth is used. In addition, N is a value defined in accordance with a bandwidth to be used, and any value of N=1, 2, 4, or 8 is substituted in accordance with a bandwidth to be used for data communication. Table 1 lists correspondence between N and each bandwidth (20 MHz, 40 MHz, 80 MHz, 160 MHz, and 320 MHz). In addition, the case of 80+80 MHz refers to a case where two 80-MHz bandwidths are used. In addition, the case of 160+160 MHz refers to a case where two 160-MHz bandwidths are used.

FIG. 6 illustrates an example of an RU allocation method indicated by the RU Allocation subfield 420. Examples 601 to 604 in FIG. 6 indicate RU division methods.

The example 601 illustrated in FIG. 6 indicates a case where an RU with the number of subcarriers of 26 is allocated to each STA. In this case, OFDMA communication can be simultaneously performed with nine STAs for each 20-MHz frequency bandwidth to be used. In addition, a Null Subcarriers refers to a subcarriers for which an RU is not set. In other words, frequency components of the second and third RUs from the left are not continuous. In addition, a Null Subcarrier may exist between the fourth RU and the fifth RU from the left, which is not illustrated in FIG. 6. Similarly, a Null Subcarrier may exist between the fifth and sixth RUs from the left.

The example 602 indicates a case where RUs with the number of subcarriers of 52 are allocated to partial STAs. OFDMA communication can be simultaneously performed with five STAs for each 20-MHz frequency bandwidth to be used. In the example 602, RUs with the number of subcarriers of 52 are allocated to four STAs, and an RU with the number of subcarriers of 26 is allocated to one STA. In addition, the RU with the number of subcarriers of 26 is obtained by combining RUs with the number of subcarriers of 13 that are positioned at the center in the example 602, and treating the combined RUs as one RU. In addition, because the center RU includes direct current (DC) tone, the center RU is treated as one RU although frequency components are not continuous in the RU.

In addition, the example 602 indicates an allocation method of RUs including four RUs with the number of subcarriers of 52, but the allocation method is not limited to this. RUs may be allocated in such a manner as to include one to three RUs with the number of subcarriers of 52. In this case, the remaining RUs have the number of subcarriers of 26. In addition, in the example 602, frequency components of the first and second RUs from the left are not continuous. Similarly, frequency components of the fourth and fifth RUs from the left are not continuous. In addition, also in this case, a Null Subcarrier may exist at least between the second and third RUs from the left, or between the third and fourth RUs from the left.

For example, in a case where an AP communicates with four STAs, a frequency band is divided as indicated in the example 602. In such a case, in a case where only one RU is allocated to one STA, for example, the centers RU (the number of subcarriers of 26) is allocated to none of the STAs. Thus, the frequency band cannot not efficiently used by an amount corresponding to the RU not allocated to a STA. Nevertheless, in the present exemplary embodiment, because the communication apparatus 102 can allocate a plurality of RUs to one STA, an RU not allocated to a STA in a case where one RU is allocated to one STA can also be allocated to a STA, and usage efficiency of the band can be enhanced.

The example 603 indicates a case where RUs with the number of subcarriers of 106 are allocated to partial STAs. OFDMA communication can be simultaneously performed with three STAs for each 20-MHz frequency bandwidth to be used. In the example 603, RUs with the number of subcarriers of 106 are allocated to two STAs, and an RU with the number of subcarriers of 26 is allocated to one STA. Alternatively, RUs with the number of subcarriers of 106 may be allocated to a plurality of STAs, and MU-MIMO communication may be performed with the plurality of STAs. In addition, the example 603 indicates an allocation method of RUs including two RUs with the number of subcarriers of 106, but the allocation method is not limited to this. RUs may be allocated in such a manner as to include one RU with the number of subcarriers of 106. In this case, the remaining RUs include at least either RUs with the number of subcarriers of 52 or RUs with the number of subcarriers of 26, and are allocated in such a manner that the total number of subcarriers becomes 132. In addition, the center RU with the number of subcarriers of 26 may avoid being allocated to a STA. In addition, also in this case, a Null Subcarrier may exist at least between the first and second RUs from the left, or between the second and third RUs from the left.

The example 604 indicates a case where an RU with the number of subcarriers of 242 is allocated to one STA. OFDMA communication can be performed with one STA for each 20-MHz frequency bandwidth to be used. Alternatively, an RU with the number of subcarriers of 242 may be allocated to a plurality of STAs, and MU-MIMO communication may be performed with the plurality of STAs.

The RU Allocation subfield 420 indicates RU allocation methods as illustrated in the examples 601 to 604 in FIG. 6, every eight bits. For example, in a case where a 80-MHz bandwidth is used as a bandwidth, RU allocation like the example 601 can be indicated in the first half eight bits, and RU allocation like the example 603 can be indicated in the second half eight bits. In addition, in a case where MIMO communication is performed in RUs with the number of subcarriers of 106 or more, the RU allocation subfield 420 also indicates the number of STAs with which MIMO communication is performed in the RUs.

A Tail 421 is a field used for adjusting a size of the Common field 410.

The User fields 411 to 419 are fields including information regarding STAs with which MU communication is to be performed. The number of User fields included in an EHT MU PPDU corresponds to the number of RUs indicated by the RU allocation subfield 420. For example, in a case where a frequency band used by the communication apparatus 102 is 20 MHz, and the RU allocation subfield 420 indicates RU allocation as in the example 601 in FIG. 6, an EHT MU PPDU includes nine User fields. In addition, this is not applied to a case where the RU allocation subfield 420 indicates that MIMO communication is performed in RUs with the number of subcarriers of 106 or more.

The User field includes a Station-Identification (STA-ID) subfield 430 and a modulation and coding scheme (MCS) subfield 431. The STA-ID subfield 430 includes identification information of a STA. Specifically, the identification information included in the STA-ID is a part of an association identifier (AID) being an identifier allocated to a STA by an AP when the STA associates with the AP (the communication apparatus 102). Among the User fields 411 to 419, a User field corresponding to an allocation destination STA of each RU indicated by the RU allocation subfield 420 is determined depending on the order of the User field. Specifically, in the RU allocation illustrated in FIG. 6, RUs are sequentially allocated in such a manner that the leftmost RU is allocated to a STA indicated by the STA-ID subfield 430 of the foremost User field. More specifically, the second RU from the left is allocated to a STA indicated by the second User field.

In addition, to an RU for which the execution of MIMO communication is indicated in the RU allocation subfield 420, STAs are allocated by the number indicated in the RU allocation subfield 420. Because information included in the RU Allocation subfield also indicates the number of STAs to be allocated to an RU used for MIMO communication, in addition to a division method of the RU, the information indicates the number of STAs that execute MIMO communication in the corresponding RU. For example, a case will be considered where the RU Allocation subfield indicates the division method as indicated by the example 603, and indicates that the number of STAs that execute MIMO communication in the leftmost RU is three. In this case, among User fields following the RU Allocation subfield, three STAs indicated by the first to third User fields are STAs that execute MIMO communication in the corresponding RU. In addition, a STA indicated by the fourth User field executes communication in the center RU with the number of subcarriers of 26. Similarly, in a case where the RU Allocation subfield indicates that the number of STAs that execute MIMO communication in the third RU is two, STAs indicated by the fifth and sixth User fields execute MIMO communication in the corresponding RU. In addition, in the present exemplary embodiment, in a case where the communication apparatus 102 allocates an RU to a STA, the communication apparatus 102 may allocate a plurality of RUs for executing MIMO communication, to the same STA. Alternatively, the communication apparatus 102 may allocate to the same STA, in combination, an RU for executing MIMO communication and an RU for not executing MIMO communication.

In addition, the MCS subfield 431 stores information indicating a modulation scheme and a coding ratio that are used in the PSDU 409 for a STA indicated by the STA-ID subfield 430. Specifically, the MCS subfield 431 includes a numerical value corresponding to a combination of a modulation scheme and a coding ratio that is defined by the IEEE802.11be standard.

FIG. 7 illustrates an example of an RU allocation method employed in a case where a plurality of RUs is allocated to one STA. FIG. 7 illustrates a case where each frequency bandwidth of 20 MHz is divided into four RUs with the number of subcarriers of 52 and one RU with the number of subcarriers of 26, and a plurality of discontinuous RUs is allocated to each STA. In this case, a first RU 701 and a fourth RU 704 from the left are allocated to a STA (for example, the communication apparatus 103) with an AID of 1. In addition, a second RU 702 and a fifth RU 705 from the left are allocated to a STA (for example, the communication apparatus 104) with an AID of 2. In addition, a third RU 703 (RU with the number of subcarriers of 26) from the left is allocated to a STA (for example, the communication apparatus 105) with an AID of 3. In such a case, the communication apparatus 102 serving as an AP transmits an EHT MU PPDU including a plurality of User fields having the same STA-ID in the EHT-SIG-B 406. Specifically, the communication apparatus 102 transmits an EHT MU PPDU including the EHT-SIG-B 406 including a STA-ID of a STA with an AID=1 in the first and fourth User fields, and including a STA-ID of a STA with an AID=2 in the second and fifth User fields. In this manner, the communication apparatus 102 can allocate a plurality of RUs with discontinuous frequency components to one STA by including, into an EHT MU PPDU, a plurality of sets of two or more User fields including the same STA-ID, in an order corresponding to RUs to which the respective User fields are allocated.

In addition, FIG. 7 illustrates an case where a plurality of RUs with discontinuous frequency components is allocated to one STA, but the case is not limited to this. The communication apparatus 102 may allocate a plurality of RUs with continuous frequency components to one STA. For example, the communication apparatus 102 may allocate the RU 702 and the RU 703 to the STA with the AID=2. In this case, an EHT MU PPDU includes the EHT-SIG-B 406 including the STA-ID of the STA with the AID=2 in the second and third User fields.

Alternatively, a communication apparatus 102 may divide the RU 703 into two RUs with the number of subcarriers of 13, and allocate each of the RUs to a STA. For example, by allocating the RU 702 and the first half of the RU 703 (RU with the number of subcarriers of 13) to the STA with the AID=2, RUs with the total number of subcarriers of 65 may be allocated to the STA. In addition, by allocating the second half of the RU 703 and the RU 704 to the STA with the AID=1, RUs with the total number of subcarriers of 65 may be allocated to the STA. In this case, an EHT MU PPDU includes the EHT-SIG-B 406 including the STA-ID of the STA with the AID=2 in the second and third User fields, and including the STA-ID of the STA with the AID=1 in the fourth and fifth User fields.

As illustrated in FIG. 7, by allocating a plurality of RUs to one STA, it becomes possible to allocate a STA also to an RU to which no STA had been allocated in the conventional method. The usage efficiency of the frequency band is therefore enhanced.

In the present exemplary embodiment, in an EHT MU PPDU, the RU Allocation subfield 420 indicating an RU division method is included in the Common field 410, but the frame format is not limited to this. In the EHT MU PPDU, information indicating an RU allocated to each STA may be included in the User fields 411 to 419. In this case, in a case where a plurality of RUs is allocated to one STA, instead of including a plurality of User fields indicating the same STA, one User field including information indicating a plurality of RUs may be included.

Figure 5:
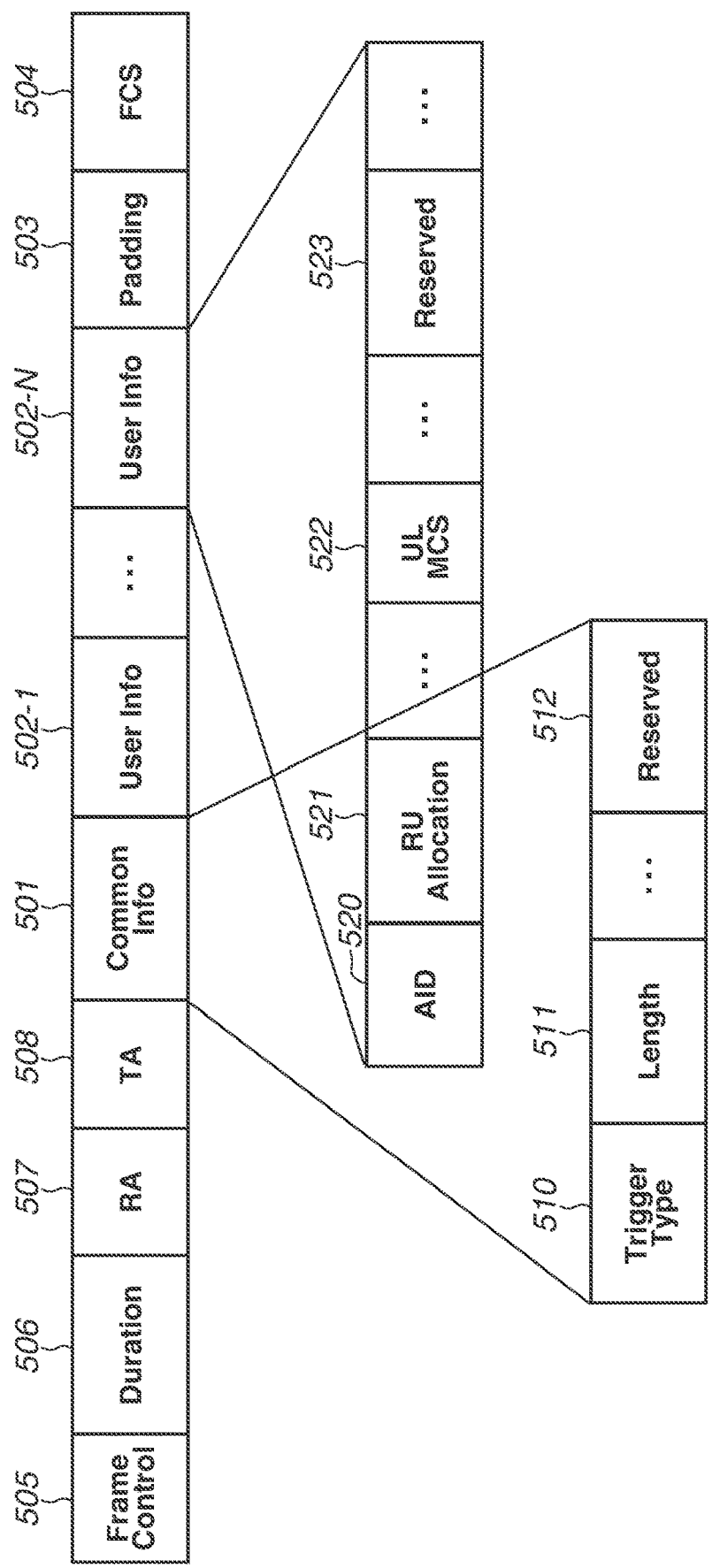
FIG. 5 is a diagram illustrating an example of a Trigger Frame to be transmitted by the communication apparatus 102.

FIG. 5 illustrates an example of a frame format of a Trigger Frame to be transmitted by the communication apparatus 102. The Trigger Frame has a frame format to be used when a communication apparatus complying with the IEEE802.11be standard executes UL MU communication. The communication apparatus 102 concurrently receives data from STAs via designated RUs, by the Trigger Frame indicating a STA that executes UL communication, and an RU allocated to each STA.

The Trigger Frame includes, from a head portion, fields of a Frame control 505, a Duration 506, a receiver address (RA) 507, and a transmitter address (TA) 508. The Trigger Frame further includes, following the TA 508, fields of Common Info 501, User Info 502, a Padding 503, and a frame check sequence (FCS) 504.

The Frame control 505 includes information indicating whether a frame is a management frame, a control frame, or a data frame, and information indicating a subtype of the frame. The subtype of a frame is information indicating whether the frame is a beacon or an action. In the case of a Trigger Frame, information indicating that the frame is a control frame, and information indicating that a subtype is a Trigger are included.

The Duration 506 includes information for setting a network allocation vector (NAV) being a duration in which communication is not started, in a STA that has received the Trigger Frame.

The receiver address (RA) 507 includes values determined based on the type of the Trigger Frame and the presence or absence of a User Info field.

The transmitter address (TA) 508 includes an address of a communication apparatus that transmits the Trigger Frame. Alternatively, in a case where the Trigger Frame is transmitted to a plurality of networks, the TA 508 includes an identifier (basic service set identifier (BSSID)) of a network to which the communication apparatus that transmits the Trigger Frame belongs.

The Common Info 501 includes information common to all STAs. Specifically, the Common Info 501 includes subfields of a Trigger Type 510, a Length 511, and a Reserved 512 from the beginning. The Trigger Type 510 indicates 0, and a communication time common to all STAs is set in the Length 511.

In a case where the Trigger Type 510 is 0, User Info fields (502-1 to 502-N) are added to the Trigger Frame. The User Info 502 includes an AID 520 for identifying a STA. RU Allocation 521 includes a size of an RU allocated to a STA indicated by the AID 520, and information indicating an ordinal number of the RU allocated to the STA that is counted from an RU with the lowest frequency. In addition, the Trigger Frame includes an UL MCS 522 including information for designating a modulation scheme and a coding ratio of data to be transmitted to an AP by a STA. The Reserved 523 is a region reserved for the future.

In a case where one RU is allocated to each STA indicated by the AID 520 of the User Info 502, in a Trigger Frame generated at one time, one User Info field is included for each STA. In the present exemplary embodiment, in a case where a plurality of RUs is allocated to one STA, a Trigger Frame generated at one time includes a plurality of pieces of User Info including the same AID. As illustrated in FIG. 7, a case where the first and fourth RUs from the left are allocated to the STA with the AID=1 is used as an example. In this case, the Trigger Frame includes User Info including the AID=1 and RU Allocation indicating the first RU, and User Info including the AID=1 and RU Allocation indicating the fourth RU.

In the present exemplary embodiment, in a case where a plurality of RUs is allocated to the same STA, a Trigger Frame includes a plurality of pieces of User Info including the same AID, but the frame format is not limited to this. The communication apparatus 102 may generate a Trigger Frame indicating a plurality of RUs in RU Allocation of a single piece of User Info. In this case, a single RU Allocation field included in a single piece of User Info may include information regarding a plurality of RUs. Alternatively, a single piece of User Info may include a plurality of RU Allocation fields.

The padding 503 is a field for adjusting a size of a Trigger Frame, and may be omitted.

The FCS 504 stands for a frame check sequence, and refers to an error-detecting code to be used for checking whether an error occurs in data during communication.

FIG. 8 is a flowchart illustrating processing to be executed by the control unit 202 reading out a computer program stored in the storage unit 201, and executing the computer program, in a case where the communication apparatus 102 performs DL-OFDMA communication.

The communication apparatus 102 starts the processing of this flow in a case where a user issues an execution instruction of DL-OFDMA communication with a STA. Alternatively, the communication apparatus 102 may start the processing of this flow in a case where a buffer amount of data addressed to a predetermined STA exceeds a predetermined threshold value, or in a case where a buffer amount of data addressed to a predetermined number of STAs exceeds a predetermined threshold value. Alternatively, the communication apparatus 102 may start the processing of this flow based on an instruction from an application operating in the communication apparatus 102.

First of all, in step S800, the communication apparatus 102 acquires a buffer amount of data addressed to each STA that is stored in the communication apparatus 102. In this step, the communication apparatus 102 is only required to acquire a buffer amount of data addressed only to a STA serving as a destination apparatus to which an EHT MU PPDU is to be transmitted in step S804 to be described below.

Next, in step S801, the communication apparatus 102 acquires communication quality of communication with each STA. In this case, the communication apparatus 102 may acquire communication quality in an RU used when communication has been performed with each STA last time, or may acquire communication quality in a temporarily-allocated RU. The communication quality to be acquired in this step is at least either a received signal strength indication (RSSI) or a signal-to-noise ratio (SNR). The RSSI stands for a received signal strength indication. In addition, the SNR stands for a signal-to-noise ratio. The communication apparatus 102 may store at least either the RSSI or the SNR obtained when communication has been performed with each STA last time. Alternatively, communication quality may be measured by the communication apparatus 102 (AP) instructing a STA to transmit a frame to the communication apparatus 102 from the STA. Specifically, first of all, by transmitting a null data PPDU (NDP) Announcement frame from the communication apparatus 102 to a STA, the STA is instructed to transmit an NDP frame to the AP. If the STA receives the NDP Announcement frame, the STA transmits an NDP frame to the AP. The AP measures communication quality using the received NDP frame. In this manner, a method of causing a STA to transmit an NDP frame is called NDP Sounding. Alternatively, communication quality may be acquired by transmitting a frame from an AP to a STA, causing the STA to measure communication quality, and receiving the measurement result from the STA.

In step S801, communication quality of the entire frequency channel used for communication with a STA may be acquired instead of communication quality of an RU.

In step S802, the communication apparatus 102 determines an RU to be allocated to each STA, based on the buffer amount acquired in step S800 and the communication quality acquired in step S801. For example, the communication apparatus 102 determines to allocate a plurality of RUs to a STA for which the buffer amount acquired in step S800 exceeds a predetermined threshold value. In addition, in a case where at least either the RSSI or the SNR indicating communication quality acquired in step S801 is equal to or smaller than a predetermined threshold value, the communication apparatus 102 determines to allocate a plurality of RUs. In addition, in a case where at least either the RSSI or the SNR acquired in step S801 for a certain STA is equal to or smaller than a predetermined threshold value, an RU different from an RU used in step S801 may be allocated to the STA. For example, the consideration will be given to a case where an RU with the number of subcarriers of 52 is desired to be allocated to a certain STA, but communication quality of a certain RU (the number of subcarriers of 26) and a different RU (the number of subcarriers of 26) with a frequency component continuous to that of the certain RU does not satisfy a predetermined condition. In such a case, the communication apparatus 102 allocates two RUs each having the number of subcarriers of 26 and having discontinuous frequency components, to the STA. In addition, in step S802, the communication apparatus 102 determines the allocation of an RU based on both of a buffer amount and communication quality, but the determination is not limited to this. The communication apparatus 102 may determine the allocation based only on either one of them. In this case, because the communication apparatus 102 need not acquire information (buffer amount or communication quality) not used for the determination of RU allocation, corresponding step S800 or S801 may be skipped.

If the communication apparatus 102 determines the allocation of an RU to each STA, in step S803, the communication apparatus 102 generates an EHT MU PPDU including a User field corresponding to the RU. In a case where the communication apparatus 102 determines in step S802 to allocate a plurality of RUs to one STA, an EHT MU PPDU generated in step S803 includes a plurality of User fields including the same STA-ID.

In the present exemplary embodiment, a User field indicates that a plurality of RUs is allocated to one STA, but the frame format is not limited to this. A different field anterior to a User field that is included in the EHT MU PPDU may indicate that a plurality of RUs is allocated to one STA. In a case where it is indicated that a plurality of RUs is not allocated to one STA, after a STA detects a corresponding User field, the STA need not analyze the User field. The processing load on the STA can be thereby reduced.

In step S804, the communication apparatus 102 transmits the EHT MU PPDU generated in step S803, to a STA. In a case where the communication apparatus 102 determines in step S802 to allocate a plurality of RUs to the same STA, the EHT MU PPDU transmitted in this step includes data addressed to the same STA, in a plurality of RUs. In this step, signals corresponding to the respective fields are sequentially transmitted in an order of the L-STF 401, the L-LTF 402, the L-SIG 403, the RL-SIG 404, the EHT-SIG-A 405, and the EHT-SIG-B 406, which are illustrated in FIG. 4. Furthermore, following the EHT-SIG-B 406, signals corresponding to the respective fields of the EHT-STF 407, the EHT-LTF 408, and the PSDU 409 are transmitted in order. In addition, the communication apparatus 102 may start the transmission in step S804 after generating all the above-described fields in step S803. Alternatively, the communication apparatus 102 may concurrently perform the generation in step S803 and the transmission in step S804. Specifically, concurrently with the generation of the L-STF 401 and the transmission of a signal corresponding to the generated L-STF 401, the communication apparatus 102 may generate the L-LTF 402 being a field of which a signal is to be transmitted next. In addition, a STA that receives the EHT MU PPDU transmitted in step S804 receives signals corresponding to the respective fields in an order of the L-STF 401, the L-LTF 402, the L-SIG 403, the RL-SIG 404, the EHT-SIG-A 405, and the EHT-SIG-B 406. In addition, following the EHT-SIG-B 406, the STA receives signals corresponding to the respective fields in an order of the EHT-STF 407, the EHT-LTF 408, and the PSDU 409.

As described above, by performing the processing illustrated in FIG. 8, the communication apparatus 102 can transmit an EHT MU PPDU including information indicating that a plurality of RUs is allocated to the same STA. The communication apparatus 102 can thereby enhance the usage efficiency of the frequency band. In addition, the communication apparatus 102 can allocate a plurality of RUs to the same STA or allocate one RU to one STA in view of a buffer amount of data addressed to a STA, and communication quality of communication with each STA. The communication apparatus 102 can flexibly allocate an RU based on a buffer amount of data addressed to each STA, and communication quality of communication with each STA.

FIG. 9 is a flowchart illustrating processing to be executed by the control unit 202 reading out a computer program stored in the storage unit 201, and executing the computer program, in a case where the communication apparatus 102 performs UL-OFDMA communication.

The communication apparatus 102 starts the processing of this flow in a case where a user issues an execution instruction of UL-OFDMA communication with a STA. Alternatively, the communication apparatus 102 may start the processing of this flow based on the reception of an execution request of UL-OFDMA communication from a STA. Alternatively, the communication apparatus 102 may start the processing of this flow based on an instruction from an application operating in the communication apparatus 102.

In step S900, the communication apparatus 102 acquires a buffer amount of transition data stored in each STA belonging to the network 101. In this step, the communication apparatus 102 may acquire a buffer amount of only a part of STAs among STAs belonging to the network 101. The communication apparatus 102 receives a notification of a buffer amount from a STA by a buffer status report (BSR) frame defined in the IEEE802.11ax standard. Specifically, first of all, the communication apparatus 102 transmits, to each STA, a BSR Poll for requesting each STA to notify the communication apparatus 102 of a data amount of data stored in the corresponding STA. Each STA that has received a request frame transmits a Buffer status report frame for notifying the communication apparatus 102 of a data amount of data addressed to the communication apparatus 102 that is stored in the corresponding STA, to the communication apparatus 102 as a response to the request frame. The communication apparatus 102 can acquire a data amount of data addressed to the communication apparatus 102 that is stored in each STA, from the received BSR frame.

In step S901, the communication apparatus 102 acquires communication quality of communication with each STA. The processing in this step is similar to the processing in step S801.

Next, in step S902, the communication apparatus 102 determines an RU to be allocated to each STA, based on the buffer amount acquired in step S900 and the communication quality acquired in step S901. The processing in this step is similar to the processing in step S802.

Next, If the communication apparatus 102 determines the allocation of an RU to each STA, in step S903, the communication apparatus 102 generates a Trigger Frame including a User Info field corresponding to the RU. In a case where the communication apparatus 102 determines in step S902 to allocate a plurality of RUs to one STA, a Trigger Frame generated in step S903 includes a plurality of User Info fields including the same AID. Alternatively, the communication apparatus 102 may generate a Trigger Frame including a User Info field including an RU allocation subfield indicating a plurality of RUs.

In a case where a plurality of User Info fields including the same AID is included, the User Info fields including the same AID may be continuously arranged in the Trigger Frame. In this case, in a case where a STA that has received the Trigger Frame analyzes a User Info field addressed to the STA, and then detects a User Info field addressed to a STA different from the STA, it becomes unnecessary for the STA to analyze subsequent User Info fields. The processing load on the STA can be thereby reduced. Alternatively, a different field included in the Trigger Frame may indicate whether a plurality of RUs is allocated to one STA. For example, the Reserved 512 illustrated in FIG. 5 may indicate the information. In a case where the Reserved 512 indicates that a plurality of RUs is not allocated to the same STA, it becomes unnecessary for a STA to analyze User Info fields following a User Info field addressed to the STA.

Next, in step S904, the communication apparatus 102 transmits the Trigger Frame generated in step S903, to a STA. In this step, signals corresponding to the respective fields are sequentially transmitted in an order of the Frame control 505, the Duration 506, the RA 507, and the TA 508, which are illustrated in FIG. 5. Furthermore, following the TA 508, signals corresponding to the respective fields of the Common Info 501, the User Info 502, the Padding 503, and the FCS 504 are transmitted in order. In addition, the communication apparatus 102 may start the transmission in step S904 after generating all the above-described fields in step S903. Alternatively, the communication apparatus 102 may concurrently perform the generation in step S903 and the transmission in step S904. Specifically, concurrently with the generation of the Frame control 505 and the transmission of a signal corresponding to the generated Frame control 505, the communication apparatus 102 may generate the Duration 506 being a field of which a signal is to be transmitted next. In addition, a STA that receives the Trigger Frame transmitted in step S904 receives signals corresponding to the respective fields in an order of the Frame control 505, the Duration 506, the RA 507, and the TA 508. In addition, following the TA 508, the STA receives signals corresponding to the respective fields in an order of the Common Info 501, the User Info 502, the Padding 503, and the FCS 504.

Then, the communication apparatus 102 receives data from a STA using an RU designated in the Trigger Frame transmitted in step S904. Specifically, the communication apparatus 102 receives data from each STA by an EHT trigger based (TB) PPDU.

As described above, by performing the processing illustrated in FIG. 9, the communication apparatus 102 can transmit a Trigger Frame including information indicating that a plurality of RUs is allocated to the same STA. The communication apparatus 102 can thereby enhance the usage efficiency of the frequency band. In addition, the communication apparatus 102 can allocate a plurality of RUs to the same STA or allocate one RU to one STA in view of a buffer amount of data addressed to an AP in a STA and communication quality of communication with each STA. The communication apparatus 102 can flexibly allocate an RU based on a buffer amount of data addressed to an AP in each STA, and communication quality of communication with each STA.

In the present exemplary embodiment, wireless communication complying with the IEEE802.11be standard has been described as an example, but the communication standard is not limited to this. Similar processing may be performed in wireless communication complying with the IEEE802.11ax standard being a legacy standard. In this case, an EHT field is replaced with a high efficiency (HE) field, for example, and the name of an EHT-SIG-B field becomes an HE-SIG-B field. Alternatively, the processing may be implemented by wireless communication complying with a succeeding standard of the IEEE802.11be standard. Also in this case, an EHT field is replaced with a corresponding field complying with the succeeding standard.

In addition, at least part or all of the processing to be executed by the communication apparatus 102 in the flowcharts illustrated in FIGS. 8 and 9 may be implemented by hardware. In a case where the processing is implemented by hardware, it is sufficient that a dedicated circuit is generated on a field programmable gate array (FPGA) from a computer program for implementing each step, by using a predetermined compiler, for example, and the dedicated circuit is used. The FPGA stands for a field programmable gate array. In addition, a gate array circuit may be formed and implemented as hardware similarly to the FPGA. In addition, the processing may be implemented by an application specific integrated circuit (ASIC).

An exemplary embodiment of the present invention can also be implemented by processing of supplying a program for implementing one or more functions of the above-described exemplary embodiment, to a system or an apparatus via a network or a storage medium, and one or more processors in a computer of the system or the apparatus reading out the program and executing the program. In addition, an exemplary embodiment of the present invention can also be implemented by a circuit (for example, ASIC) implementing one or more functions.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, usage efficiency of a frequency band can be enhanced by enabling a communication apparatus to allocate a plurality of RUs to a different communication apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   at least one memory that stores a set of instructions; and
   at least one processing circuit, wherein the communication apparatus is caused, by the at least one processing circuit executing the instructions and/or the at least one processing circuit itself operating, to perform operations comprising:
   generating an Extremely High Throughput (EHT) Multi User (MU) Physical Layer Protocol Data Unit (PPDU) including at least
   a Legacy-Short Training Field (L-STF),
   a Legacy-Long Training Field (L-LTF),
   a Legacy-Signal (L-SIG), an Extremely High Throughput-Short Training Field (EHT-STF), and
an Extremely High Throughput-Long Training Field (EHT-LTF); and
transmitting the generated EHT MU PPDU,
wherein a field between the L-SIG and the EHT-STF includes information indicating that a plurality of Resource Units (RUs) is allocated to one different communication apparatus,
wherein the field between the L-SIG and the EHT-STF includes at least one subfield indicating Resource Unit (RU) allocation, and
wherein a number of the at least one subfield is one in a case where a bandwidth of the EHT MU PPDU is 20 MHz, a number of the at least one subfield is one in a case where a bandwidth of the EHT MU PPDU is 40 MHz, a number of the at least one subfield is two in a case where a bandwidth of the EHT MU PPDU is 80 MHz, and a number of the at least one subfield is four in a case where a bandwidth of the EHT MU PPDU is 160 MHz.

2. The communication apparatus according to claim 1, wherein the information indicating that the plurality of Resource Units is allocated to the one different communication apparatus is stored in a User field which is a subfield associated with a Station Identification (STA-ID) corresponding to the different communication apparatus.

3. The communication apparatus according to claim 2, wherein the User field further includes a Modulation and Coding Scheme (MCS) subfield including information indicating a coding ratio and a modulation scheme that are used for data addressed to the different communication apparatus corresponding to the STA-ID.

4. The communication apparatus according to claim 2, wherein the field between the L-SIG and the EHT-STF further includes a Common field, the Common field includes RU allocation indicating allocation of an RU, and the information is stored in the User field following the Common field.

5. The communication apparatus according to claim 4, wherein a plurality of User fields is stored in the field of the EHT MU PPDU in a case where the communication apparatus communicates with two or more different communication apparatuses, and RUs indicated in the RU allocation are sequentially allocated from an RU with a lowest frequency in such a manner that an RU is allocated to a different communication apparatus corresponding to a STA-ID included in a foremost User field.

6. The communication apparatus according to claim 1, wherein the communication apparatus is further caused to perform operations comprising:
acquiring a buffer amount of data addressed to the different communication apparatus;
acquiring communication quality with the different communication apparatus; and
determining allocation of an RU to the different communication apparatus, based on at least one of the acquired buffer amount, and the acquired communication quality,
wherein the EHT MU PPDU is generated based on a determined allocation of an RU.

7. The communication apparatus according to claim 6, wherein the acquired communication quality is at least either a Received Signal Strength Indication (RSSI) or a Signal-to-Noise Ratio (SNR).

8. The communication apparatus according to claim 1, wherein the EHT MU PPDU complying with an Institute of Electrical and Electronics Engineers (IEEE) 802.11be standard is generated.

9. The communication apparatus according to claim 1, wherein frequency components of the plurality of RUs are discontinuous.

10. The communication apparatus according to claim 1, wherein a number of the at least one subfield is eight in a case where a bandwidth of the EHT MU PPDU is 320 MHz.

11. A control method of a communication apparatus, the control method comprising:
generating an Extremely High Throughput (EHT) Multi User (MU) Physical Layer Protocol Data Unit (PPDU) including
a Legacy-Short Training Field (L-STF),
a Legacy-Long Training Field (L-LTF),
a Legacy-Signal (L-SIG),
an Extremely High Throughput-Short Training Field (EHT-STF), and
an Extremely High Throughput-Long Training Field (EHT-LTF); and
transmitting the EHT MU PPDU generated in the generating,
wherein a field between the L-SIG and the EHT-STF includes information indicating that a plurality of Resource Units (RUs) is allocated to one different communication apparatus,
wherein the field between the L-SIG and the EHT-STF includes at least one subfield indicating Resource Unit (RU) allocation, and
wherein a number of the at least one subfield is one in a case where a bandwidth of the EHT MU PPDU is 20 MHz, a number of the at least one subfield is one in a case where a bandwidth of the EHT MU PPDU is 40 MHz, a number of the at least one subfield is two in a case where a bandwidth of the EHT MU PPDU is 80 MHz, and a number of the at least one subfield is four in a case where a bandwidth of the EHT MU PPDU is 160 MHz.

12. The control method according to claim 11, wherein a number of the at least one subfield is eight in a case where a bandwidth of the EHT MU PPDU is 320 MHz.

13. A non-transitory computer readable storage medium storing a program to cause, when the program is executed, a communication apparatus to perform:
generating an Extremely High Throughput (EHT) Multi User (MU) Physical Layer Protocol Data Unit (PPDU) including at least
a Legacy-Short Training Field (L-STF),
a Legacy-Long Training Field (L-LTF),
a Legacy-Signal (L-SIG),
an Extremely High Throughput-Short Training Field (EHT-STF), and
an Extremely High Throughput-Long Training Field (EHT-LTF); and
transmitting the generated EHT MU PPDU,
wherein a field between the L-SIG and the EHT-STF includes information indicating that a plurality of Resource Units (RUs) is allocated to one different communication apparatus,
wherein the field between the L-SIG and the EHT-STF includes at least one subfield indicating Resource Unit (RU) allocation, and
wherein a number of the at least one subfield is one in a case where a bandwidth of the EHT MU PPDU is 20 MHz, a number of the at least one subfield is one in a case where a bandwidth of the EHT MU PPDU is 40 MHz, a number of the at least one subfield is two in a case where a bandwidth of the EHT MU PPDU is 80 MHz, and a number of the at least one subfield is four in a case where a bandwidth of the EHT MU PPDU is 160 MHz.

14. The non-transitory computer readable storage medium according to claim 13, wherein a number of the at least one subfield is eight in a case where a bandwidth of the EHT MU PPDU is 320 MHz.

15. A communication apparatus comprising:
at least one memory that stores a set of instructions; and
at least one processing circuit, wherein the communication apparatus is caused, by the at least one processing circuit executing the instructions and/or the at least one processing circuit itself operating, to perform operations comprising:
receiving an Extremely High Throughput (EHT) Multi User (MU) Physical Layer Protocol Data Unit (PPDU) including at least
a Legacy-Short Training Field (L-STF),
a Legacy-Long Training Field (L-LTF),
a Legacy-Signal (L-SIG),
an Extremely High Throughput-Short Training Field (EHT-STF), and
an Extremely High Throughput-Long Training Field (EHT-LTF); and
wherein a field between the L-SIG and the EHT-STF includes information indicating that a plurality of Resource Units (RUs) is allocated to the communication apparatus,
wherein the field between the L-SIG and the EHT-STF includes at least one subfield indicating Resource Unit (RU) allocation,
wherein a number of a subfield is one in a case where a bandwidth of the EHT MU PPDU is 20 MHz, a number of the subfield is one in a case where a bandwidth of the EHT MU PPDU is 40 MHz, a number of the subfield is two in a case where a bandwidth of the EHT MU PPDU is 80 MHz, and a number of the subfield is four in a case where a bandwidth of the EHT MU PPDU is 160 MHz.

16. The communication apparatus according to claim 15, wherein the information indicating that the plurality of Resource Units is allocated to the communication apparatus is stored in a User field which is a subfield associated with a Station Identification (STA-ID) corresponding to the communication apparatus.

17. The communication apparatus according to claim 16, wherein the User field further includes a Modulation and Coding Scheme (MCS) subfield including information indicating a coding ratio and a modulation scheme that are used for data addressed to the communication apparatus corresponding to the STA-ID.

18. The communication apparatus according to claim 16, wherein the field between the L-SIG and the EHT-STF further includes a Common field, the Common field includes RU allocation indicating allocation of an RU, and the information is stored in the User field following the Common field.

19. The communication apparatus according to claim 15, wherein the EHT MU PPDU complying with an Institute of Electrical and Electronics Engineers (IEEE) 802.11be standard is generated.

20. The communication apparatus according to claim 15, wherein frequency components of the plurality of RUs are discontinuous.

21. The communication apparatus according to claim 15, wherein a number of the at least one subfield is eight in a case where a bandwidth of the EHT MU PPDU is 320 MHz.

22. A control method of a communication apparatus, the control method comprising:
receiving an Extremely High Throughput (EHT) Multi User (MU) Physical Layer Protocol Data Unit (PPDU) including at least
a Legacy-Short Training Field (L-STF),
a Legacy-Long Training Field (L-LTF),
a Legacy-Signal (L-SIG),
an Extremely High Throughput-Short Training Field (EHT-STF), and
an Extremely High Throughput-Long Training Field (EHT-LTF),
wherein a field between the L-SIG and the EHT-STF includes information indicating that a plurality of Resource Units (RUs) is allocated to the communication apparatus,
wherein the field between the L-SIG and the EHT-STF includes at least one subfield indicating Resource Unit (RU) allocation, and
wherein a number of a subfield is one in a case where a bandwidth of the EHT MU PPDU is 20 MHz, a number of the subfield is one in a case where a bandwidth of the EHT MU PPDU is 40 MHz, a number of the subfield is two in a case where a bandwidth of the EHT MU PPDU is 80 MHz, and a number of the subfield is four in a case where a bandwidth of the EHT MU PPDU is 160 MHz; and
transmitting data using the plurality of RUs allocated to the communication apparatus.

23. The control method according to claim 22, wherein a number of the at least one subfield is eight in a case where a bandwidth of the EHT MU PPDU is 320 MHz.

24. A non-transitory computer readable storage medium storing a program to cause, when the program is executed, a communication apparatus to perform:
receiving an Extremely High Throughput (EHT) Multi User (MU) Physical Layer Protocol Data Unit (PPDU) including at least
a Legacy-Short Training Field (L-STF),
a Legacy-Long Training Field (L-LTF),
a Legacy-Signal (L-SIG),
an Extremely High Throughput-Short Training Field (EHT-STF), and
an Extremely High Throughput-Long Training Field (EHT-LTF),
wherein a field between the L-SIG and the EHT-STF includes information indicating that a plurality of Resource Units (RUs) is allocated to the communication apparatus,
wherein the field between the L-SIG and the EHT-STF includes at least one subfield indicating Resource Unit (RU) allocation, and
wherein a number of a subfield is one in a case where a bandwidth of the EHT MU PPDU is 20 MHz, a number of the subfield is one in a case where a bandwidth of the EHT MU PPDU is 40 MHz, a number of the subfield is two in a case where a bandwidth of the EHT MU PPDU is 80 MHz, and a number of the subfield is four in a case where a bandwidth of the EHT MU PPDU is 160 MHZ; and
transmitting data using the plurality of RUs allocated to the communication apparatus.

25. The non-transitory computer readable storage medium according to claim 24, wherein a number of the at least one subfield is eight in a case where a bandwidth of the EHT MU PPDU is 320 MHz.

* * * * *